(12) United States Patent  
Ono

(10) Patent No.: US 6,519,015 B2  
(45) Date of Patent: Feb. 11, 2003

(54) LIQUID CRYSTAL DISPLAY DEVICE AND METHOD OF FABRICATING THEREOF

(75) Inventor: Koichi Ono, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/983,925

(22) Filed: Oct. 26, 2001

(65) Prior Publication Data

US 2002/0047960 A1 Apr. 25, 2002

Related U.S. Application Data

(62) Division of application No. 09/349,938, filed on Jul. 8, 1999, now Pat. No. 6,335,774.

(30) Foreign Application Priority Data

Jul. 10, 1998 (JP) ............................................. 10-195560

(51) Int. Cl.[7] ............................................. G02F 1/1335
(52) U.S. Cl. ............................ 349/106; 349/104; 430/7
(58) Field of Search ................................ 349/106, 104; 430/7, 321, 311

(56) References Cited

U.S. PATENT DOCUMENTS

| 5,503,952 A | 4/1996 | Suzuki et al. ................ 430/7 |
| 5,530,570 A * | 6/1996 | Terumoto |
| 5,770,349 A | 6/1998 | Suginoya et al. ........... 430/321 |
| 5,888,679 A | 3/1999 | Suzuki et al. ................. 430/7 |
| 6,268,092 B1 * | 7/2001 | Akashi et al. |

FOREIGN PATENT DOCUMENTS

| JP | 404106524 A | * | 4/1992 |
| JP | 404131828 A | * | 5/1992 |

* cited by examiner

Primary Examiner—Julie Ngo  
(74) Attorney, Agent, or Firm—Morgan, Lewis & Bockius LLP

(57) ABSTRACT

A liquid crystal display device including first and second substrates on a front side and rear side of the device, respectively, which are bonded to each other on their peripheries by a sealant with a prescribed gap therebetween, the first and second substrates including electrode patterns formed thereon. A liquid crystal material is doped with dichroic dyes injected into the gap to constitute a liquid crystal layer. A first color filter film with a prescribed color is provided at an area where the electrode pattern is not provided on the first substrate on the front side. A second color filter film with the same color as the prescribed color at at least an area where the electrode pattern is provided on the second substrate on the rear side.

5 Claims, 5 Drawing Sheets

TRANSMITTED LIGHT (COLORED)

TRANSMITTED LIGHT (NON-COLORED)

LIQUID CRYSTAL DISPLAY DEVICE AND METHOD OF FABRICATING THEREOF

This is a divisional of application(s) application No. 09/349,938 filed on Jul. 8, 1999 now U.S. Pat. No. 6,335,774, the disclosure of which is hereby incorporated by reference herein in its entirety.

BACKGROUND OF THE INVENTION

1. Field of the Invention

The present invention relates to a liquid crystal display device capable of providing bright display without using a polarizing plate, and more particularly to a liquid crystal display device capable of providing desired display by contrast between a color filter film applied to a substrate and a liquid crystal material doped with dichroic dyes.

2. Description of the Related Art

A liquid crystal display device has such a structure as seen from the general structure of a transmission type liquid crystal display panel shown in FIG. 8. Specifically, as seen from FIG. 8, electrode patterns 3 and 4 are formed on the surfaces of insulating substrates 1 and 2, and orienting films 5 and 6 are formed thereon. The two insulating substrates 1 and 2 are bonded to each other on their peripheries by a sealant 7 with a prescribed gap of a spacer (not shown) therebetween. The liquid crystal is injected into the gap to constitute a liquid crystal layer 8. On the outsides of the insulating substrates 1 and 2, polarizing plates 9 and 10 are provided. In this way, a liquid crystal display panel 11 is formed.

On the rear side of the liquid crystal panel 11 which is opposite to a viewer, a back light 13 such as a bulb, a fluorescent lamp, etc. is arranged through an optical diffusing plate 12. With respect to the light from the back light 13, only linear polarized light of natural light in a certain vibrating direction can be transmitted by means of the polarizing plate 9 on the rear side. According to whether or not a voltage is applied to the liquid crystal layer, the light travels with the vibrating direction twisted or travels straight as it is with the vibration direction not twisted. Whether or not the light is transmitted can be controlled by the absorption axis of the polarizing plate 10 on the front side which is a viewer side to provide a desired display.

As described above, the conventional liquid crystal display device uses the polarizing plates to adopt only the light vibrating in a certain direction of natural light. Therefore, most of the light is interrupted by the polarizing plate so that unless a bright back-light is used, bright display cannot be realized. However, use of the bright back-light excessively consumes a battery in a liquid crystal display device such as a portable appliance which is driven by the battery. This applies to a reflection type liquid crystal display device in which light is caused to be incident from the viewer side to use the reflected light. Namely, in the reflection type liquid crystal display device, a bright image can be obtained only in a bright place.

In addition, the polarizing plate is very expensive to increase the production cost of the liquid crystal display device. This provides a limit of cost reduction in the LC device which is used in an inexpensive electronic appliance such as a portable appliance. The present invention has been accomplished in order to solve such a problem.

SUMMARY OF THE INVENTION

An object of the present invention is to provide a liquid crystal display device capable of providing bright display without using polarizing plates and can be manufactured at low cost.

In order to attain the above object, in accordance with a first aspect of the present invention, there is provided a liquid crystal display device comprising: first and second substrates with electrode patterns formed thereon on a front side and rear side of the device, which are bonded to each other on their peripheries by a sealant with a prescribed gap therebetween; a liquid crystal material doped with dichroic dyes injected into the gap to constitute a liquid crystal layer; a first color filter film with a prescribed color provided at an area where the electrode pattern is not provided on the first substrate on the front side; and a second color filter film with the same color as the prescribed color at at least an area where the electrode pattern is not provided on the second substrate on the rear side,.

In the present invention, the first substrate on the front side refers to a substrate on the side of a viewer when he sees the liquid crystal display device. The second substrate on the rear side refers to another substrate on the side (background) far from the viewer. Further, the color filter film with a prescribed color refers to a color filter of the background of the liquid crystal display device, which may provide a whitish background such as transmitted white light by printing e.g. white ink and yellow ink. The color filter film may be provided not on the side of the liquid crystal layer of the substrate, but may be provided on the side opposite to the liquid crystal layer.

In the above configuration, an area where the electrode pattern is not provided on the first substrate on the front side is viewed as the color, e.g. white of the color filter on the front side. As for the area where the electrode pattern is provided on the first substrate on the front side, the portion with a voltage applied between itself and an opposite electrode, where liquid crystal molecules rise, appears as the color of the color filter applied to the surface of the electrode pattern on the second substrate on the rear side. The portion with a voltage not applied between itself and an opposite electrode appears as the color (e.g. black) of the dichroic dyes added to the liquid crystal. Thus, by controlling the application of a voltage, a desired display in e.g. black can be made on a white background.

In accordance with the present invention, a desired display can be realized by voltage control without using a polarizing plate so that a very bright display screen can be obtained. Therefore, the liquid crystal display device according to the present invention can be applied to a transmission type liquid crystal display device such as a portable appliance or a reflection type liquid crystal display device which can be used in a dim place. The present invention, in which no polarizing plate is used, can be realized at low cost, thus contributing the cost reduction of an electronic appliance using the liquid crystal display device.

A second aspect of the device is a liquid crystal display device according to the first aspect, wherein said first substrate comprises a light-permeable substrate; a light-permeable electrode pattern formed on an internal surface of said light-permeable substrate so as to correspond to a light emitting segment; a first color filter film formed at an area where the light-permeable electrode pattern is not provided; and an orienting film formed to cover the entire surface of the first substrate.

A third aspect of the device is a liquid crystal display device according to the first aspect, wherein said second substrate comprises a substrate, an electrode pattern formed on an internal surface of said substrate so as to correspond to a light emitting segment, a second color filter film with the same color as the prescribed color stacked on the electrode pattern so as to have the same pattern as that of the electrode pattern, and an orienting film formed to cover the entire surface of the second substrate.

A fourth aspect of the device is a liquid crystal display device according to the first aspect, wherein said first substrate comprises a light-permeable electrode pattern formed on an internal surface of a light-permeable substrate so as to correspond to a light emitting segment; an orienting film formed thereon and a first color filter film on an outer surface of said light-permeable substrate formed at an area where the light-permeable electrode pattern is not provided; and an orienting film formed to cover entirety of the first substrate.

A fifth aspect of the device is a liquid crystal display device according to the first aspect, wherein said second substrate comprises a substrate; an electrode pattern formed on an internal surface of said substrate so as to correspond to a light emitting segment; an orienting film formed thereon; and a second color filter film with the same color as the prescribed color on the outer surface of the substrate so as to have the same pattern as that of the electrode pattern.

A sixth aspect of the device is a liquid crystal display device according to the first aspect, wherein said second substrate comprises a substrate; an electrode pattern formed on an internal surface of said substrate so as to correspond to a light emitting segment; a second color filter film with the same color as the prescribed color stacked on said electrode pattern to cover the entire surface of the substrate; and an orienting film formed thereon.

A seventh aspect of the device is a liquid crystal display device according to the first aspect, wherein said second substrate comprises a substrate; an electrode pattern formed on an internal surface of said substrate so as to correspond to a light emitting segment; an orienting film formed thereon; and a second color filter film with the same color as the prescribed color formed so as to cover the entire outer surface of said substrate.

An eighth aspect of the device is a liquid crystal display device according to the first aspect, wherein said second substrate comprises a substrate; an electrode pattern formed on an internal surface of said substrate so as to correspond to a light emitting segment; a second color filter film with the same color as the prescribed color formed so as to cover the entire outer surface of said substrate and an orienting film formed thereon.

A ninth aspect of the device is a liquid crystal display device according to the first aspect, wherein said second substrate comprises a color substrate with the same color as said prescribed color; and an electrode pattern formed on an internal surface of said substrate so as to correspond to a light emitting segment.

A tenth aspect of the method is a method of manufacturing a liquid crystal display device which comprises the steps of:
  forming a first substrate composed of a light-permeable electrode pattern formed an internal surface of a light-permeable substrate so as to correspond to a light emitting segment and a first color filter film with a prescribed color formed at an area where the light permeable electrode pattern is not provided;
  forming a second substrate includes a substrate, an electrode pattern formed on an internal surface of a substrate so as to correspond to the light emitting segment and a second color filter film with the same color as the prescribed color stacked on the electrode pattern so as to have the same pattern as that of the electrode pattern;
  bonding said first and said second substrate to each other on their peripheries by a sealant with a prescribed gap between the opposite electrode patterns; and
  injecting a liquid crystal material doped with dichroic dyes into the gap.

An eleventh aspect of the method is a method of manufacturing a liquid crystal display according to the tenth aspect, wherein said step of forming the first substrate comprises the steps of:
  forming a transparent conductive film on the internal surface of said light-permeable substrate;
  patterning said transparent conductive film using a first resist pattern formed by photolithography as a mask to provide the electrode pattern; and
  forming the first color filter film on the entire resultant surface with said first resist pattern being left;
  removing said first resist pattern by the lift-off technique to leave said first color filter film only an area where the electrode pattern is not provided.

A twelfth aspect of the method is a method of manufacturing a liquid crystal display according to the tenth aspect, wherein said step of forming said second substrate comprises the steps of:
  successively stacking a conductive film and the second color filter film on the surface of the substrate; and
  patterning said conductive film and second color filter film formed by photolithography using a second resist pattern as a mask.

A thirteenth aspect of the method is a method of manufacturing a liquid crystal display according to the tenth aspect, wherein said step of forming said first substrate comprises:
  forming a transparent conductive film on the surface of the light-permeable substrate;
  applying a photoresist on said transparent conductive film;
  forming the first color filter film of photosensitive resin of an inverted type of the photoresist on a rear side of said transparent substrate; and
  irradiating the photoresist with light having a wavelength making said photosensitive resin photosensitive so that said transparent conductive film and said photosensitive resin are patterned to have the same pattern.

The above and other objects and features of the present invention will be more apparent from the following description taken in conjunction with the accompanying drawings.

DESCRIPTION OF THE PREFERRED EMBODIMENTS

Figure 1:
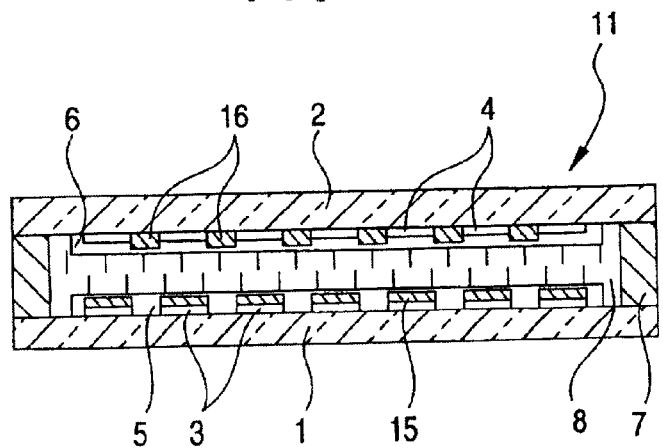
FIG. 1 is a sectional view of an embodiment of a liquid crystal (LC) display device according to the present invention.

Now referring to the drawings, an explanation will be given of the LC device according to the present invention.

In a LC device according to the present invention, as seen from FIG. 1 showing the section of an embodiment thereof, electrode patterns 3 and 4 having about 0.08 μm of thickness respectively, are formed on the insulating substrates 1 and 2 disposed on the rear side and front side of the device, respectively. The two insulating substrates 1 and 2 are bonded to each other on their peripheries by a sealant 7 with a prescribed gap therebetween. The liquid crystal material doped with dichroic dyes is injected into the gap to constitute a liquid crystal layer 8. At an area where the electrode pattern 4 is not provided on the first substrate 2 on the front side of the device, a white color film 16, for example, is provided. At an area where the electrode pattern 3 is not provided on the second substrate 1 on the rear side of the device, a white color film 15, for example, is provided. In this way, a liquid crystal display panel 11 is formed.

The liquid crystal display panel 11 has also a similar structure to the conventional liquid crystal display panel. Specifically, electrode patterns 3 and 4 of transparent conductive films of ITO are formed on the surfaces of insulating substrates 1 and 2 of glass, plastic, etc., and orienting films 5 and 6 of e.g. polyimide are formed thereon. The two insulating substrates 1 and 2 are bonded to each other on their peripheries by a sealant (sealing material) 7 with a prescribed gap of a spacer (not shown) therebetween. The liquid crystal is injected into the gap to constitute a liquid crystal layer 8.

In the present invention, on the inner wall (side of the liquid crystal layer) of an area of the substrate 2 on the front side of the device where the electrode pattern 4 is not provided, a white ink is provided by offset printing or screen printing to form a white color filter film 16. Likewise, on the inner wall (side of the liquid crystal layer) of an area of the substrate side 1 on the rear side of the device where the electrode pattern 3 is not provided, a white ink is provided by offset printing or screen printing to form another white color filter film 15. The white color filter films 15 and 16 may not be made of white ink, but may be made of whitish paint such as yellow ink. Further, in e.g. negative display, without using the whitish color filter, blackish color filters may be used, and. bright dichroic dyes may be added to the liquid crystal material. Another color may be used as a background color.

In the present invention, a liquid crystal material doped with dichroic dyes is used in which the dichroic dyes (guest) having anisotropy in the absorption of visible light in a long axis and a short axis of a molecule are solved in a liquid crystal (host) with a fixed arrangement. For example, with a voltage applied to the liquid crystal layer, i.e. liquid crystal molecules oriented vertically, when light is incident, the dichroic dyes are oriented in the same direction as the liquid crystal molecules so that their absorption axis coincides with the direction of the electric field of natural light. Thus, the colored light having absorbed the color of the dyes travels. On the other hand, with a voltage applied to the liquid crystal, the dichroic dyes as well as the liquid crystal molecules, the non-colored white light travels. In this way, the liquid crystal containing the dichroic dyes having such a property (for example, it is blackish when white light is incident) is injected between the two insulating substrates 1 and 2. Incidentally, the color of the dyes should not be limited to black, another color may be used which is suited to the preferable display color according to the background color of the color filter film.

Further, it should be noted in the present invention that no polarizing plates are provided on any of the outer surfaces of the insulating substrates 1 and 2. Specifically, in the general guest/host cell doped with dichroic dyes which is used for color display, in order that the light absorption axis of the dichroic dyes coincides with the vibrating direction of the white light thereby to obtain bright color contrast, only linear polarized light in a fixed direction is caused to be incident. On the other hand, in the present invention, which intends to display a display portion in e.g. black on the background of e.g. white, the black color may not be completely black, but may be gray. Therefore, it is not necessary to maximize the difference in a light absorption degree between when the voltage is applied and when voltage is not applied. For this reason, without using the polarizing plate, entire light is taken in to acquire a bright display screen.

Figure 2:
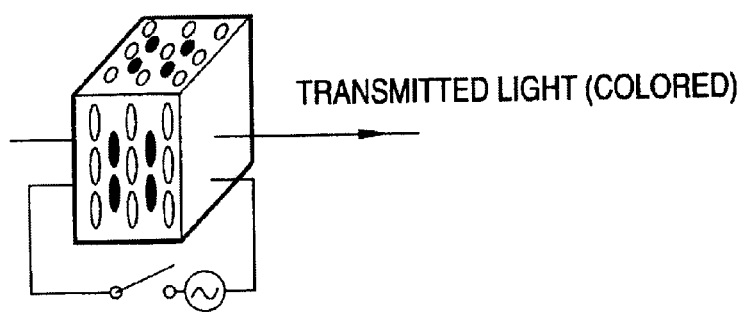
FIGS. 2A and 2B are views for explaining the operation of the LC display device shown in FIG. 1.
Figure 2:
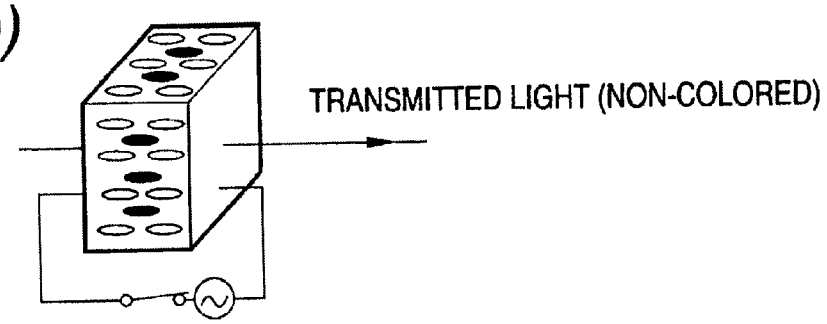

In accordance with the present invention, in the area where the electrode pattern on the front side substrate is not provided, regardless of the state of the liquid crystal molecules, the light outgoes through the color filter film provided on the front side substrate so that it becomes the light with the color of the color filter film. Thus, the background of the liquid crystal panel is e.g. white. On the other hand, in the area where the electrode pattern on the front side substrate is provided, unless a voltage is applied between the electrode pattern on the front side substrate and that on the rear side substrate, as shown in FIG. 2A, since the dichroic dyes as well as the liquid crystal molecules are oriented in the vibrating direction of light, the light colored in black of the dichroic dyes outgoes. When the voltage is applied between both electrode patterns, as shown in FIG. 2B, the dichroic dyes as well as the liquid crystal molecules rise and so do not absorb the light. Thus, the white light permeated the white color filter film provided on the electrode pattern on the rear side substrate outgoes as it is. Accordingly, by controlling the voltage to be applied to each pixel so that the voltage is not applied to the pixel to be displayed, desired display can be obtained. In this case, since light is incident on the liquid crystal without passing the polarizing plate, it does not become the linear polarized light with a fixed vibrating direction. Where there is part of light not completely absorbed by the dichroic dyes even when the voltage is applied, the black is correspondingly diluted to become gray. This does not deteriorate the display itself. As a result, the entire incident light inclusive of the light vibrated in a fixed direction by the polarizing plate is caused to outgo on the front side. This realizes the display on a very blight screen. In the case with the back-light with relatively lower luminance or in the reflection type display device, a desired display can be realized in a dim place.

Figure 3:
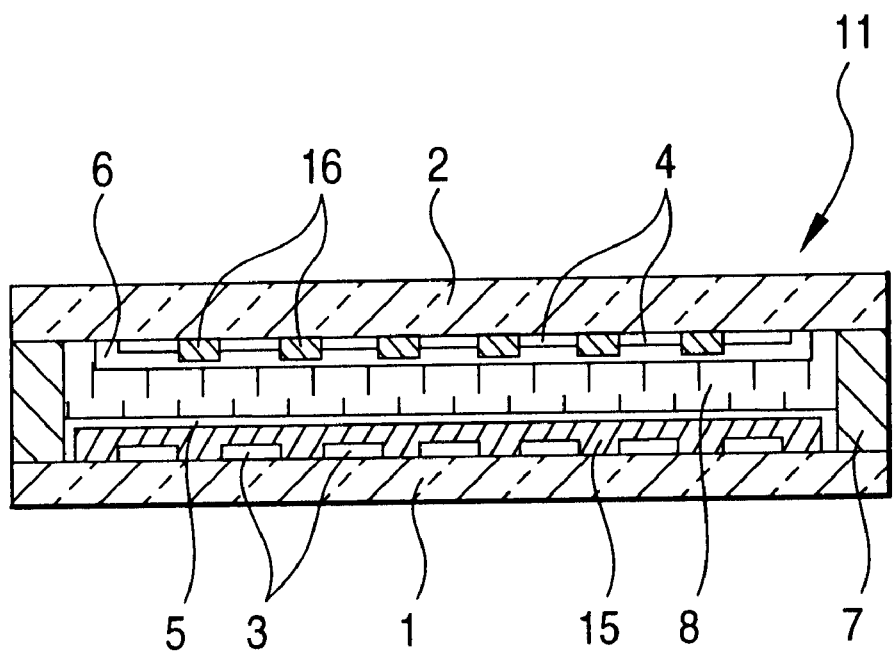
FIG. 3 is a sectional view showing a modification of the LC device shown in FIG. 1.

FIG. 3 is a sectional view showing a modification of the liquid crystal display device shown in FIG. 1. In this modification, the white filter 15 provided on the rear side insulating substrate 1 is formed on not only the electrode pattern 3 but also the area void thereof so that it is formed on the entire inner wall of the rear side substrate. The light corresponding to the area void of the electrode pattern is colored by the color filter film 16 provided on the front side. Therefore, this modification has an advantage that the light permeating the rear side insulating substrate 1 may have any color and the ink may not be painted through a mask with the electrode pattern formed. Incidentally, in FIG. 3, other like reference numerals, which refer to like elements in FIG. 1, will not be explained here.

Figure 4:
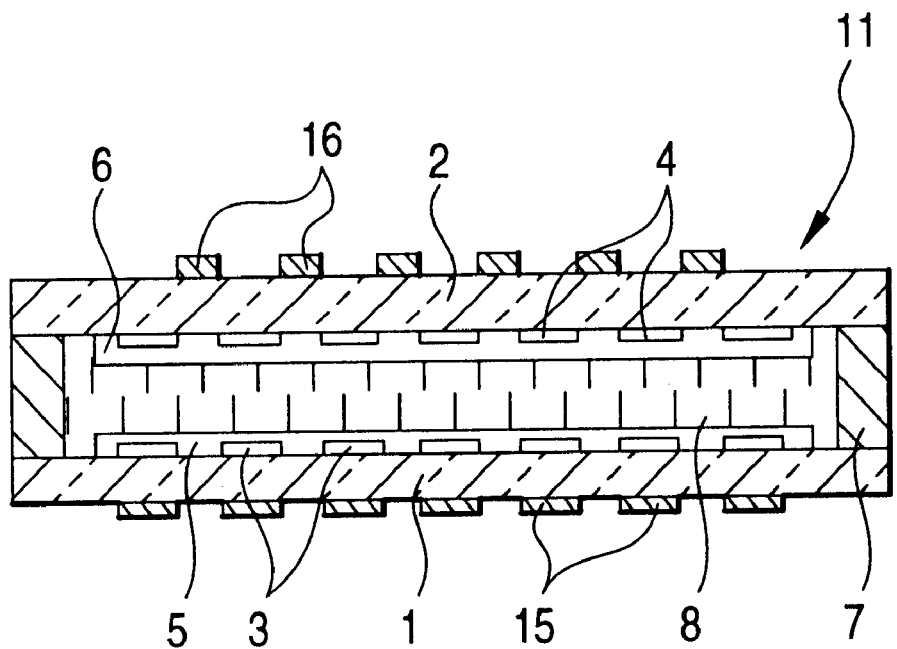
FIG. 4 is a sectional view showing another modification of the LC device shown in FIG. 1.
Figure 5:
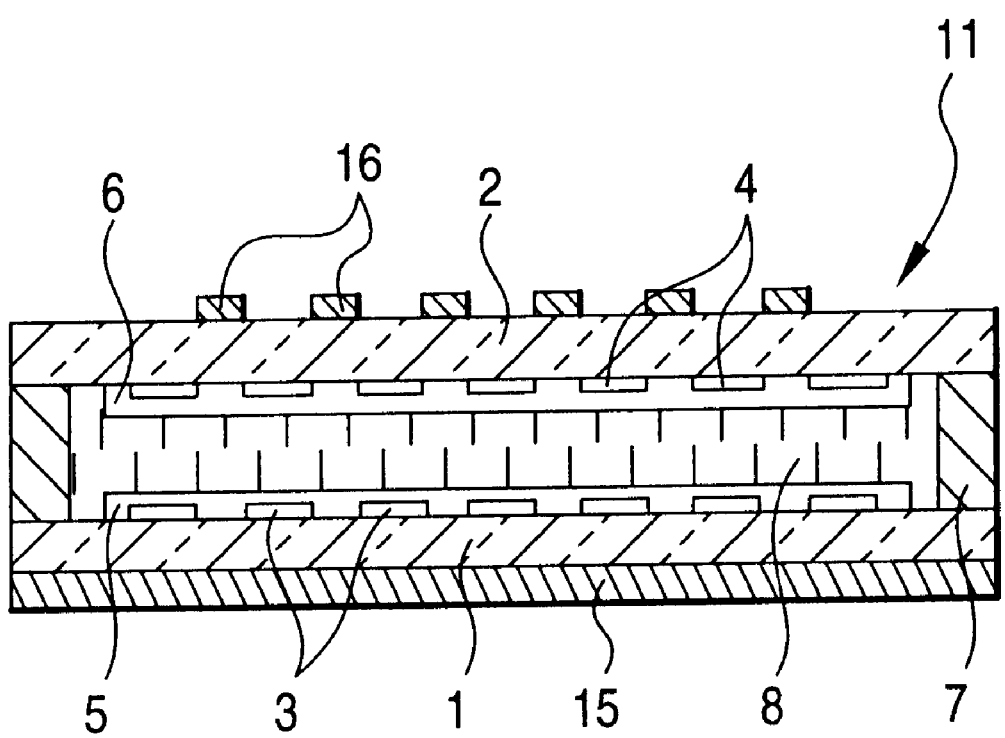
FIG. 5 is a sectional view showing a further modification of the LC device shown in FIG. 1.

FIGS. 4 and 5 are sectional views for showing further modifications of the liquid crystal display device of FIG. 1. Specifically, in each of the embodiments described above, the color filter films 15 and 16 are provided on the inner side, i.e. the side of the liquid crystal layer of the insulating substrates 1 and 2. On the other hand, in each of the modifications shown in FIGS. 4 and 5, the color filter films 15 and 16 are provided on the external side of the insulating substrates 1 and 2. Where the color filter films 15 and 16 are provided on the inner side, parallax between the liquid crystal layer and pixels to be displayed does not occur, thereby preventing blooming relative to the pixels. However, the electrode patterns 3 and 4 are about 0.1 μm thick whereas the color filter films 15 and 16 are about 1 μm. This provides great unevenness on the inner side which adversely affects the display characteristic. On the other hand, provision of the color filter films on the external side does not almost produce unevenness on the inner side, thus improving the display characteristic. In addition, this is also no hitch since no polarizing plates are provided on the external sides. Incidentally, FIG. 4, which corresponds to FIG. 1, shows an example in which the color filter film 15 is formed at only the area corresponding to the electrode pattern 3 of the rear side insulating substrate 1. FIG. 5, which corresponds to FIG. 3, shows another example in which the color filter film 15 is formed on the entire surface of the rear side substrate 1. In these figures also, like reference numerals refer to like elements.

Each of the embodiments described above is directed to a transmission type liquid crystal display device. However, it is needless to say that provision of a reflection plate on the external side of the rear side insulating substrate realizes a reflection type liquid crystal display device in the same configuration.

An explanation will be given of a method of manufacturing a liquid crystal display device according to the first embodiment of the present invention.

Figure 6A:
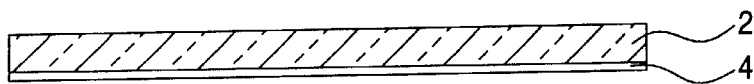
FIGS. 6A–6G are views showing the process for manufacturing a liquid crystal display according to the first embodiment of the present invention.

First, as seen from FIG. 6A, a transparent conductive film 4 of ITO (indium/tin oxide) having a thickness of about 0.08 μm is formed on the internal surface of a light-permeable glass substrate having a thickness of 0.7–1.1 μm.

Figure 6B:
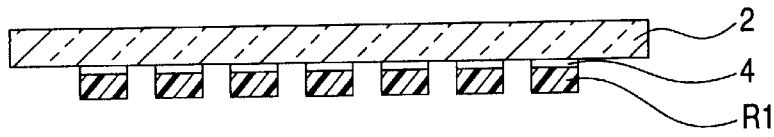

As seen from FIG. 6B, a photoresist is applied onto the transparent conductive film 4, and the transparent conductive film 4 is patterned using a first resist pattern R1 formed by photolithography as a mask, thereby providing an electrode pattern.

Figure 6C:
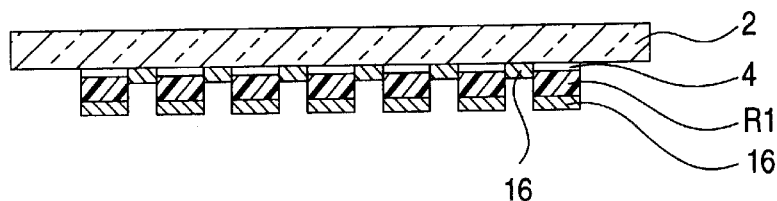

As seen from FIG. 6C, with the first resist pattern R1 being left, a color filter film 16 is applied on the entire internal surface.

Figure 6D:
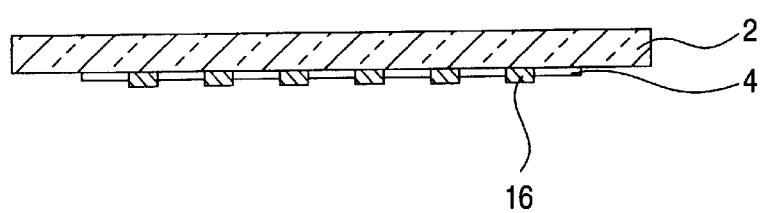

As seen from FIG. 6D, the first resist pattern R1 is removed by the "lift-off technique" so that the color filter film 16 is left only at an area where the electrode pattern is not provided. Thereafter, an orienting film 6 is formed.

Figure 6E:
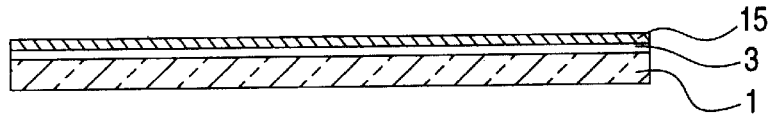

Further, as seen from FIG. 6E, a glass substrate 1 similar to the glass substrate used as the first substrate is prepared. On the surface of the glass substrate 1, a transparent conductive film 3 of ITO having a thickness of about 0.08 μm and a color filter film 15 are formed.

Figure 6F:
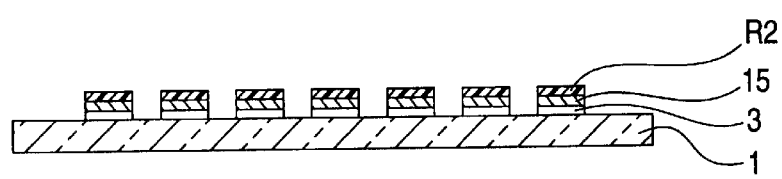

As seen from FIG. 6F, resist R2 is applied to the color filter film 15, and the color filter film 15 and transparent conductive film 3 are patterned using the second resist pattern R2 formed by photolithography as a mask. Thus, a second substrate with the pattern of the color filter film on the electrode pattern 3 is obtained. Thereafter, an orienting film 5 is formed.

The first and the second substrate 1 and 2 are bonded to each other on their peripheries by a sealant with a prescribed gap between the opposite electrode patterns.

Figure 6G:
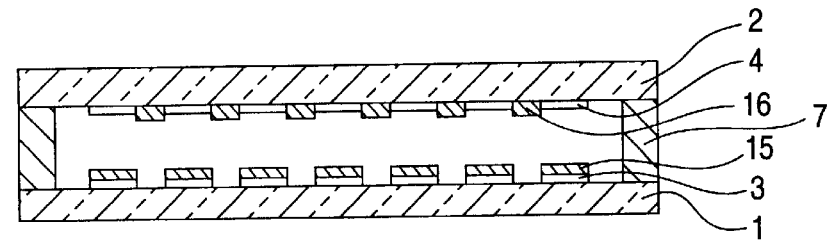

Finally, as seen from FIG. 6G, a liquid crystal material doped with dichroic dyes is injected into the gap.

In this way, the liquid crystal display device according to the first embodiment of the present invention can be accomplished.

In the method as described above, the photolithography step has only to be done once for each substrate. In addition, the electrode pattern and color filter film of the first substrate can be formed accurately with good controllability.

An explanation will be given of the method of manufacturing the liquid crystal display device as shown in FIG. 4, particularly process of forming an electrode pattern 4 on the internal surface of the substrate 2 and a color filter film 16 on the outer surface of the substrate 2.

In this embodiment, with a transparent conductive film and resist being previously formed on the internal surface of a transparent substrate, and with photosensitive resin being formed on outer surface of the transparent substrate, light exposure is done from the side of the internal surface to pattern both the inner and outer surfaces simultaneously.

Figure 7A:
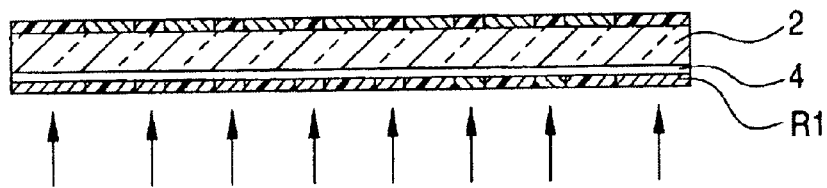
FIGS. 7A–7B are views a part of the process for manufacturing a liquid crystal display device according to the third embodiment of the present invention.

First, as seen from FIG. 7A, on the inner surface of a light-permeable glass substrate 2 having a thickness of 0.7–1.1 μm, a transparent conductive film 4 of ITO having a thickness of about 0.08 μm and resist R of a positive type are formed, and on the outer surface thereof, a color filter film 16 of photosensitive resin of a negative type is formed.

Figure 7B:
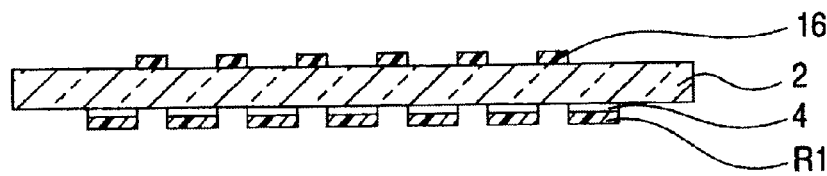
Figure 8:
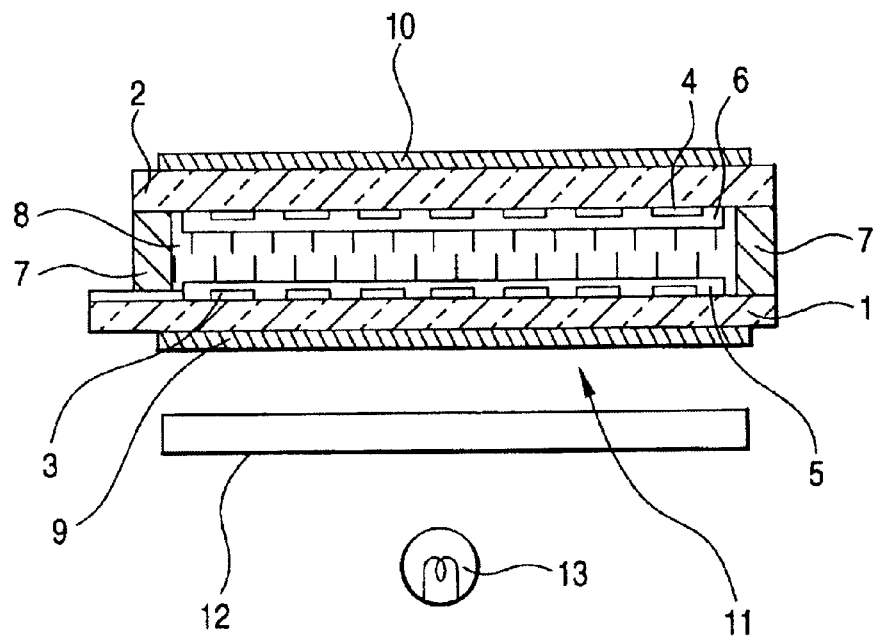
FIG. 8 is a sectional view showing a conventional liquid crystal display device.

Next, as seen from FIG. 7B, light exposure is done from the side of the inner surface so that patterns of the resist and the photosensitive resin which are inverted types from each other are obtained. FIG. 7B shows the state after the transparent conductive film has been pattern-etched.

After development, the second substrate 1 to be used for the liquid crystal display device as shown in FIG. 4 is obtained.

Such a process also permits the patterns to be easily obtained with high accuracy.

Further, by using a color glass substrate serving as a color filter as the first substrate, no color filter is required. This contributes to low-profiling of the liquid crystal display device, and reduces the number of man-hours of manufacturing.

In the embodiments described above, although a glass substrate was used as the substrate, a flexible material such as a light-permeable film may be adopted. This contributes to low-profiling and weight-reduction of the liquid crystal display device. Such a liquid crystal display device can be very effectively used for a portable telephone.

What is claimed is:

1. A liquid crystal display device, comprising:

first and second substrates on a front side and rear side of the device, respectively, are bonded to each other on their peripheries by a sealant with a prescribed gap between the first and second substrates, the first and second substrates each having an electrode pattern formed on an internal surface of the substrates, each electrode pattern including a plurality of electrode segments, and having an orienting film formed thereon;

a liquid crystal material doped with dichroic dyes injected into the gap to constitute a liquid crystal layer;

a first color filter film with a prescribed color is provided at a plurality of areas on an outer surface of the first substrate, and between the electrode segments;

a second color filter film with the same color as the prescribed color is provided on an outer surface of the second substrate, wherein the electrode pattern includes respective light-permeable material, and the first color filter film is formed on areas of the outer surface of the first substrate corresponding to areas of the inner surface where the electrode segments are not provided.

2. A liquid crystal display device, comprising:

first and second substrates on a front side and rear side of the device, respectively, are bonded to each other on their peripheries by a sealant with a prescribed gap between the first and second substrates, the first and second substrates each having an electrode pattern formed on an internal surface of the substrates, each electrode pattern including a plurality of electrode segments, and having an orienting film formed thereon;

a liquid crystal material doped with dichroic dyes injected into the gap to constitute a liquid crystal layer;

a first color filter film with a prescribed color is provided at a plurality of areas on an outer surface of the first substrate, and between the electrode segments; and a second color filter film with the same color as the prescribed color is provided at a plurality of areas on an outer surface of the second substrate, and corresponding to each of the electrode segments, wherein a plurality of the second color filter films has a same pattern as that of the electrode pattern, each of the second color filter films and electrode segments being opposed to each other with the second substrate being disposed therebetween.

3. A liquid crystal display device, comprising:

first and second substrates on a front side and rear side of the device, respectively, are bonded to each other on their peripheries by a sealant with a prescribed gap between the first and second substrates, the first and second substrates each having an electrode pattern formed on an internal surface of the substrates, each electrode pattern includes a plurality of electrode segments, and having an orienting film formed thereon;

a liquid crystal material doped with dichroic dyes injected into the gap to constitute a liquid crystal layer;

a first color filter film with a prescribed color is provided between the electrode segments on an inner surface of the first substrate; and a second color filter film with the same color as the prescribed color is provided on an inner surface of the second substrate, wherein the second color filter film is stacked on said electrode pattern to cover an entire surface of the electrode segments on the second substrate.

4. A liquid crystal display device, comprising:

first and second substrates on a front side and rear side of the device, respectively, are bonded to each other on their peripheries by a sealant with a prescribed gap between the first and second substrates, the first and second substrates each having an electrode pattern formed on an internal surface of the substrates, each electrode pattern including a plurality of electrode segments, and having an orienting film formed thereon;

a liquid crystal material doped with dichroic dyes injected into the gap to constitute a liquid crystal layer;

a first color filter film with a prescribed color is provided at a plurality of areas on an outer surface of the first substrate, and between the electrode segments; and a second color filter film with the same color as the prescribed color is provided at an outer surface of the second substrate, wherein the second color filter film is formed for covering an entire outer surface of the second substrate.

5. A liquid crystal display device, comprising:

first and second substrates on a front side and rear side of the device, respectively, are bonded to each other on their peripheries by a sealant with a prescribed gap between the first and second substrates, the first and second substrates each having an electrode pattern formed on an internal surface of the substrates, each electrode pattern including a plurality of electrode segments, and having an orienting film formed thereon;

a liquid crystal material doped with dichroic dyes injected into the gap to constitute a liquid crystal layer;

a first color filter film with a prescribed color which is provided at a plurality of areas on an inner surface of the first substrate, and between the electrode segments; and a second color filter film with the same color as the prescribed color is stacked on each of the electrode segments on an inner surface of the second substrate.

* * * * *